United States Patent

[11] 3,634,046

[72] Inventor Louis N. Allen
 Short Hills, N.J.
[21] Appl. No. 774,007
[22] Filed Nov. 7, 1968
[45] Patented Jan. 11, 1972
[73] Assignee American Cyanamid Company
 Stamford, Conn.

[54] RECOVERY OF SULFUR FROM NATURALLY OCCURRING ORES
 10 Claims, 1 Drawing Fig.
[52] U.S. Cl. ................................................. 23/308 S,
 23/293 S, 23/229
[51] Int. Cl. .............................................. C01b 17/08
[50] Field of Search ................................. 23/293 S,
 308 S, 312 S, 229

[56] References Cited
UNITED STATES PATENTS

| | | | |
|---|---|---|---|
| 1,374,422 | 4/1921 | Bragg | 23/308 |
| 1,586,539 | 6/1926 | Thornton | 23/308 |
| 1,808,938 | 6/1931 | Seil | 23/308 |
| 2,429,477 | 3/1941 | Menefee et al. | 23/293 |
| 2,537,842 | 1/1951 | McGauley et al. | 241/17 |
| 2,731,332 | 1/1956 | Ackert et al. | 23/308 |
| 2,934,413 | 4/1960 | McGauley | 23/308 |

Primary Examiner—Norman Yudkoff
Assistant Examiner—R. T. Foster
Attorney—William J. Van Loo, Jr.

ABSTRACT: A process for recovering elemental sulfur from sulfur-bearing ores by a melting process wherein a preheated slurried grind is steamed as a bed while maintaining a pressure differential above and below the bed so that molten sulfur is forced below the bed where it is collected.

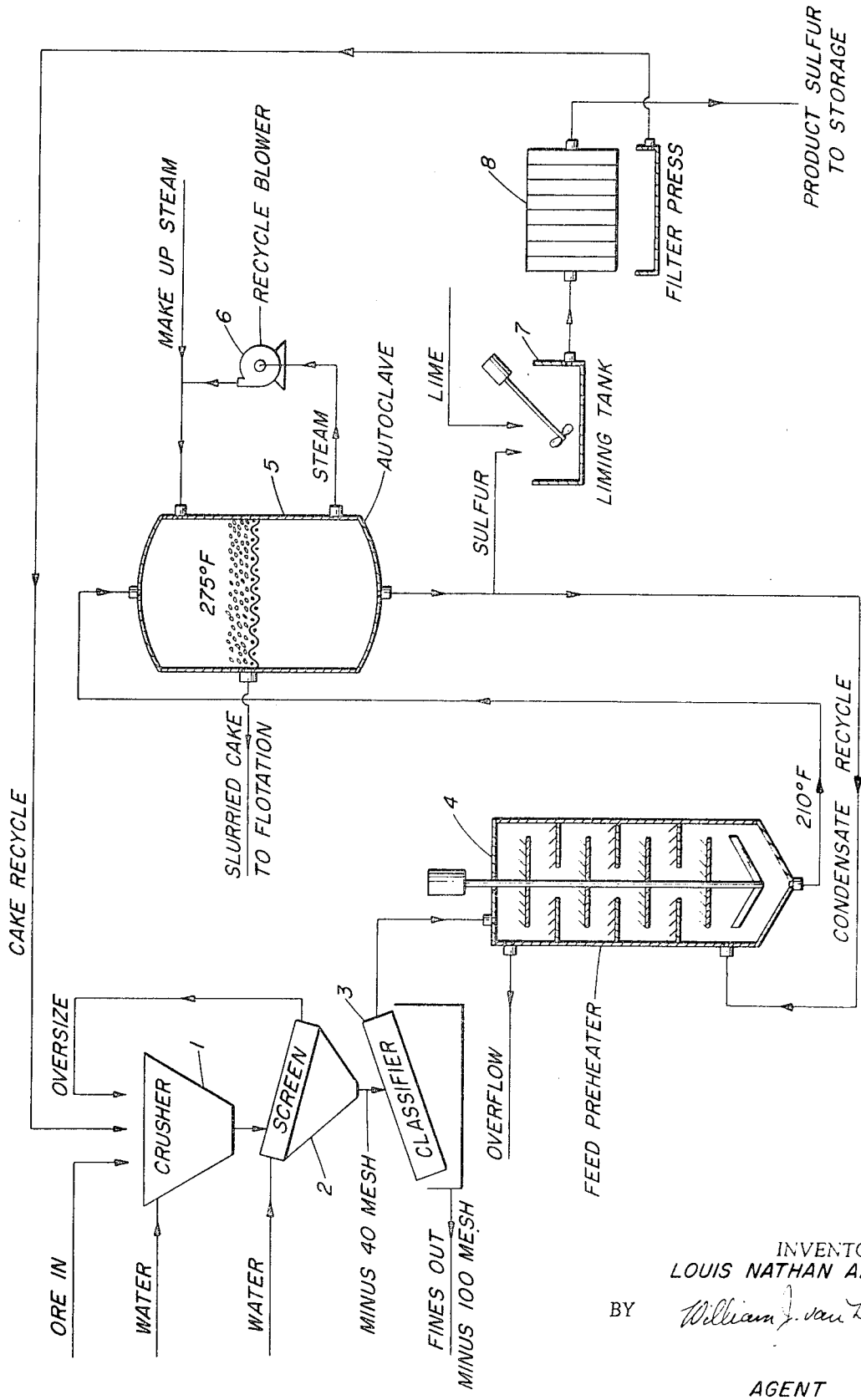

RECOVERY OF SULFUR FROM NATURALLY OCCURRING ORES

BACKGROUND OF THE INVENTION

This invention relates to a process for the recovery of elemental sulfur from ores containing deposits thereof. More particularly, this invention relates to an improved melting process for the recovery of elemental sulfur from sulfur-bearing ores.

There are many deposits of native sulfur-bearing ores throughout the world which are sufficiently rich in sulfur to warrant commercial development. Typical of these are deposits in Colombia, in Egypt, and in the island of Milos, all of which have a free sulfur content within the range of 20–35 percent or better. Attempts have previously been made to separate this sulfur by melting and agglomeration processes, in which the ore is heated to a temperature above the melting point of sulfur (113°–120° C.) to cause the sulfur droplets to run together and separate from the ore. However, these processes are not commercially usable with some ores, notably those containing the sulfur in finely distributed form throughout the ore, as in Egyptian ores. Moreover, the sulfur recoveries obtainable by these processes seldom exceed 50–75 percent, and even with the most favorable ones, a recovery of about 80 percent of the sulfur is about the best that can be obtained.

One of the principal reasons for the relatively low recovery of sulfur by a simple melting and agglomeration process is the fact that a certain proportion of the molten sulfur is inevitably held in the interstices of the gangue. U.S. Pat. No. 2,537,842, while taking advantage of the principle of agglomeration separation to the extent that it can be used with the particular ore under treatment, provides an improved method of separating the sulfur phase from the gangue material by means of froth flotation. The process, however, has the deficiency in that pyrites, when present, are carried along with the sulfur recovered causing difficulties in purifying. Furthermore, recycling of tails from sulfur recovery causes buildup of pyrites in the filter cake, thus increasing difficulties of sulfur purification.

SUMMARY OF THE INVENTION

The present invention overcomes all of the above difficulties, eliminates the need for flotation to obtain sulfur, and produces a pure sulfur with a high percentage of recovery by first slurrying in water a grind of the ore, then introducing the slurry to a preheater which raises the temperature of the slurry while maintaining solids content thereof substantially constant, forming the preheated slurry as a bed having upper and lower surfaces, next steaming the upper surface of the slurry at a steam pressure sufficient to produce molten sulfur of low viscosity, withdrawing steam pressure from below the lower surface of the bed so as to maintain a pressure differential between the two bed surfaces and collect sulfur and condensate beneath the lower bed while maintaining ore residue as a bed, and finally separately removing sulfur and condensate from beneath the lower surface of the bed. The recovered sulfur may then be limed and filtered for added purity. Additional features of the invention include use of hot condensate from the steaming operation to supply the preheater and to preheat feed to the steam boiler used to supply steam for melting sulfur as well as the use of a converter to recycle the lower pressure steam withdrawn from beneath the lower bed surface to the higher pressure feed to the upper bed surface.

DESCRIPTION OF THE INVENTION

The invention will be further described with reference to the accompanying drawings, in which the single FIGURE is a flow diagram in which the various steps of a complete process are illustrated.

In carrying out the process of the present invention, a native sulfur-bearing ore such as those referred to above may be crushed and, if desired, may be given a preliminary beneficiation by any suitable process. The ore is ground and screened with return of oversize to the grinding process, which is preferably conducted in the presence of water to prevent spontaneous ignition of sulfur. The particle size of the grind may vary but for most efficient operation of the process it is preferred to have a particle size in the range of minus 3 to plus 100 mesh, preferably minus 10 to plus 40 mesh, with larger particles returned to the grinding process and fines either discarded or subjected to other processes for recovery of sulfur. The particular particle size range preferred enables ready melting of sulfur without causing plugging of the equipment employed. Discarding of the fines generally results in losses of less than 5 percent of the sulfur values in the ore.

The grinding operation is carried out by a crusher, designated as 1 in the FIGURE, which preferably operates in conjunction with a water supply; a screen, designated as 2 in the FIGURE, also preferably operates in conjunction with a water supply and rejects oversize particles, returning them to the crusher; and a classifier, designated as 3 in the FIGURE, which removes the fines and carries the slurried ore of acceptable size to the preheater. The flow of water during the grinding operations is controlled so that a slurry is produced which upon entry to the preheater preferably is about 50 percent solids by weight. It is not essential that this solids level be achieved during the grinding operations since, as will be described hereinbelow, the preheater is adapted to adjust the solids content prior to entry of the slurry to the steaming operation. In the event grinding is carried out in the absence of water, the ground ore is introduced into the preheater in conjunction with water so as to achieve a slurry of about 50 percent solids, with solids adjustment being made by operation of the preheater.

The preheater is employed to heat the slurry prior to its entrance into the equipment in which the steaming operation is to be performed. This operation has an important bearing on the economic efficiency of the process since by utilizing hot condensate emanating from the steaming operation, it reduces steam requirements in the steaming operation and in the overall process. The slurry may be supplied to the preheater of about 50 percent solids, in which case the preheater is adapted to maintain solids at this level. In the event that the slurry solids are other than about 50 percent upon entry to the preheater, the operation of the preheater can be controlled so as to adjust slurry solids to about 50 percent. The particular design of the preheater is not especially critical and numerous suitable devices are available. A preferred device is that shown as 4 in the FIGURE, which comprises a container in which are arranged a layered series of trays intercommunicating between layers. In operation, the slurry is introduced onto trays in the upper layer of the container and the slurry then flows downwardly through succeeding layers while hot condensate of water flows countercurrently or upwardly therethrough. The trays are equipped with rakes which discharge slurry particles through tray openings onto trays in the next lower layer. The tray openings are staggered so as to permit the slurry particles through tray openings onto trays in the next lower layer. The tray openings are staggered so as to permit the slurry particles to drop a single tray layer per raking. The flow rates of both hot condensate or water and slurry particles are preferably adjusted to maximize heat exchange. An overflow port is appropriately positioned in the container near the upper layer of trays so that excess liquid is removed and the slurry solids will be about 50 percent upon exit from the preheater. It is preferred that the slurry be heated so as to have a temperature of slightly less than the boiling point of water at ambient atmospheric pressure as it exits from the preheater. While it is not critical that this temperature be achieved in order to operate the process successfully, it is important to economic considerations, as indicated above.

When the process is initiated, it will be necessary to supply external heat in order to heat the slurry, since hot condensate is unavailable. However, on subsequent processing, hot condensate may be used to supplement or replace the external heat source. Upon continuous operation of the process, the available hot condensate is more than adequate to supply the preheater and may be employed to preheat boiler feed in addition.

The preheated slurry is then immediately passed into the equipment employed in conducting the steaming operation. An autoclave, indicated as 5 in the FIGURE, is a preferred means for conducting the steaming operations. A suitable screen is placed in the autoclave forming upper and lower stages therein. The mesh size of the screen is such that it will retain substantially all of the ore particles thereon and enable molten sulfur droplets to pass therethrough. The slurry is placed on the screen so as to form a bed, which forms a partition between stages enabling a pressure differential to be effected between stages. The mesh size of the screen will vary depending upon the particle size of the solids in the slurry. In the preferred embodiment where the lower limit of particle size is plus 100 mesh, the mesh size of the screen could obviously be 100 mesh, but to minimize flow of particles of ore through the screen due to reduction in particle size by loss of sulfur by melting, it is preferred to use a screen of somewhat finer mesh than the initial upper limit of particle size as determined by the classifier so as to retain the larger particles which would then act as filter media in retaining smaller particles. Since the bed is prepared prior to steaming, any small particles passing through the bed as it is prepared could be recycled to the bed. Thus, mesh sizes, eminently suitable for use with slurry particles in the preferred particle size range include 10 through 200 mesh as well as others where the grind permits, the sizes being U.S. Sieve Series, ASTM E-11-61.

It is generally necessary to operate both stages of the autoclave at steam pressures that yield temperatures sufficient to provide molten sulfur. It is necessary to melt sulfur in the upper stage in order to separate it from the ore. It is generally preferred to maintain the sulfur in molten form in the lower stage in order to withdraw it therefrom. It is preferred that the operating pressures be such that the molten sulfur has a low viscosity to minimize separation problems. Minimum steam pressure to yield molten sulfur varies from 23 to 29 pounds per square inch absolute, depending upon the precise melting point of the form of sulfur encountered. It has been found that steam pressures in the range of about 35 to 55 pounds per square inch absolute p.s.i.a. are eminently suitable for use in the upper stage of the autoclave. Higher steam pressures tend to create high sulfur viscosities which interfere with efficient sulfur recovery due to flow resistance. Lower steam pressures tend to require extensive steaming periods and also produce high sulfur viscosities. The viscosity of sulfur is less critical once it has been separated from the ore and, accordingly, use of lower operating steam pressures in the lower autoclave stage creates no special problems.

When the preheated slurry is introduced into the upper stage of the autoclave, there is an immediate flow through the partitioning screen of water from the slurry, resulting in an increase of slurry solids on the screen to about 80 percent. As steaming commences in the autoclave, there is a gradual melting of sulfur in the ore, the melt flowing through the interstices of the bed formed by the slurry on the screen. Thus, there are collected in the lower stage of the autoclave both condensate from the slurry and the sulfur melted from the ore.

The pressure in the lower stage of the autoclave is reduced by withdrawing steam therefrom through a suitable port in the autoclave. The rate of withdrawal of steam should be adequate to provide sufficient driving force to expedite flow of molten sulfur from the upper stage to the lower stage of the autoclave by virtue of the pressure differential thus produced. For economies in steam consumption, it is greatly preferred to employ a withdrawal rate which not only provides adequate driving force but also enables the withdrawn steam to be brought up readily to the feed pressure supplying the upper stage of the autoclave and thus be recycled. It has been found that when the withdrawal rate of steam from the lower autoclave stage is such as to effect about an 8 lb. differential or more in steam pressures between the upper and lower stages of the autoclave, there is provided an expeditious flow of molten sulfur from the upper stage to the lower stage. At the same time, when the pressure differential is about 8 lbs., the withdrawn steam can be readily recompressed for recycling to the upper stage feed by means of a single open, back-shrouded, impeller-type, centrifugal blower, illustrated as 6 in the FIGURE. This type of blower can be driven by a steam turbine. When the steam pressure differential is significantly greater than about 8 lbs., it is generally necessary to employ a bank of two or more of the blowers indicated above. In view of the increased steam consumption necessitated by operating a bank of blowers over a greater pressure differential in the recompression cycle, it is greatly preferred to limit the steam differential to about 8 lbs. between stages. Regardless of the particular steam pressure differential chosen in the steaming operation, it should be borne in mind that the minimum steam pressure required for maintaining sulfur molten is 23-29 p.s.i.a., depending upon the crystalline form thereof as it occurred in nature, and operating pressures in each of the stages should be suitably selected to take the minimum pressure into account.

When substantially all of the sulfur in the ore slurry has melted and passed from the upper autoclave stage to the lower stage, steaming is discontinued and the molten sulfur in the lower stage is allowed to settle to the bottom of the lower stage while the condensate forms a top layer thereover. It is generally preferred to maintain pressure on the autoclave during the settling stage. After settling is complete, sulfur and condensate are separately withdrawn from the autoclave. The hot condensate advantageously is cycled to the preheater and boiler feed, as previously indicated. The sulfur collected may contain bits of ore which pass through the partitioning screen and may be wet with weak acid obtained as byproduct. Substantially all of the pyrite in the ore is unaffected by the recovery process and remains in the bed on the screen.

If desired, the sulfur may be purified to remove contaminants. This may be accomplished by passing the molten sulfur into a liming tank, as shown by 7 in the FIGURE, where it is mixed with a sufficient quantity of lime to both neutralize the acid which may be present and act as a filter aid. The quantity of lime used may vary but generally an amount which is between about 1 percent and 2 percent by weight based on the weight of sulfur present is preferred. The limed sulfur is then filtered on a suitable filter, as shown by 8 in the FIGURE. A filter having jacketed plates which can be heated to maintain sulfur in molten condition is preferred. The sulfur obtained from the filter is of high purity and is eminently suitable for use where such purity is desirable. If desired, the filter cake may be recycled back to the ore grinding operation for recovery of any ore values remaining.

After the sulfur and hot condensate have been removed from the autoclave, the ore residue on the screen is reslurried and removed from the autoclave through side openings located above the screen. The reslurried residue may then be discarded or transferred to other processes for recovery of additional ore values.

The foregoing is a description of the best method at present known for practicing the invention, but it should be understood that other types of equipment may be substituted for those illustrated diagrammatically in the drawings. Thus, for example, instead of the crusher illustrated in the FIGURE as 1, there may be employed other types of grinding devices. Also instead of the layered tray type of preheater, illustrated as 4 in the FIGURE, there may be employed a series of decantation units containing ore in decantation thickness through which passes the hot condensate or water by gravity, replacing colder water there present. The heating medium passes consecutively from one decantation unit to another heating the contents of each to some extent in its passage. When the ore in the first unit is at the proper temperature, the unit is removed, the one reslurried at 50 percent solids at proper temperature and introduced into the autoclave, while the decantation unit is refilled with fresh slurry and added to the end of the series of units, thus maintaining a constant flow of slurry being preheated.

This invention will be further illustrative by the following specific examples. It should be understood, however, that although these examples may describe in detail some of the preferred embodiments of the invention, they are given primarily for purposes of illustration and the invention in broader aspects is not limited thereto.

EXAMPLE 1

A sample of low grade ore from Colombia, S.A., containing about 35 percent of elemental sulfur in a volcanic silicate and oxide gangue was wet ground to yield particles in the range of minus 10 to plus 40 mesh. A total of 100 lbs. of ore were ground with coarse particles recycled to the grind and fines rejected. Thirty pounds of the total were rejected as fines but since many of the small particles were barren of sulfur only 7 lbs. of the available sulfur, representing 20 percent, were rejected as fines.

The wet-ground ore was prepared as a slurry of 50 percent solids by weight. The slurry was introduced into a layered tray type of preheater where the slurry temperature was raised to 98° C. by use of hot water.

The preheated slurry was formed as a bed on a screen of 100 mesh size in a two-stage autoclave, with the bed as formed serving as the partition between stages. The upper stage of the autoclave was steamed at 45 p.s.i.a. and steam was withdrawn from the lower stage to maintain a pressure differential of 8 p.s.i.a. between stages, thus yielding a steam pressure of 37 p.s.i.a. in the lower autoclave stage. Steaming was continued for 10 minutes after which the steam was shut off and the sulfur allowed to settle while the pressure was maintained on the autoclave. After about 2 minutes for settling, the pressure on the autoclave was released and sulfur and condensate were separately withdrawn from the lower stage of the autoclave. Some fine barren particles were obtained in the condensate representing a solids content therein of about 5 percent by weight. A total of 25 lbs. of sulfur was obtained from the lower stage of the autoclave, which represented 71.5 percent of the sulfur value in the original ore and 89 percent of the sulfur value introduced as slurry into the autoclave.

Further treatment of the slurry cake residue from the autoclave and rejected fines by flotation processes resulted in an additional yield of 8.25 lbs. of sulfur. The total yield of sulfur from the ore was thus 33.25 lbs., representing 95 percent of the sulfur available in the ore.

Since the above process was run without the advantage of hot condensate from previous runs to supply the preheater and no provision was made to recycle steam withdrawn from the lower stage of the autoclave, steam consumption was about 5 lbs. per 1 lb. of sulfur obtained by the process.

EXAMPLE 2

The procedure of example 1 was repeated in every material detail except for the following provisions:
1. the hot condensate recovered from the lower stage of the autoclave from example 1 was supplied to the preheater and
2. the steam withdrawn from the lower stage of the autoclave was recompressed to 45 p.s.i.a. by means of a single open, back-shrouded, impeller-type, steam-driven, centrifugal blower and the recompressed steam was recycled to the steam feed to the upper autoclave stage.

Substantially the same yield of sulfur was obtained as in example 1, but steam consumption was reduced to about 1.5 lbs. per 1 lb. of sulfur obtained by the process.

EXAMPLE 3

Following the procedure of example 2, a series of process runs was made in rapid succession. By starting each subsequent run as rapidly as possible following completion and discharge of the prior run, it was possible to further conserve steam consumption by taking advantage of preheated equipment and more effectively utilizing hot condensate in the preheater and in heating feed to the boiler supplying steam to the autoclave.

Substantially the same yield of sulfur was obtained as in the prior examples 1 and 2 but steam consumption was further reduced to about 1 lb. per 1 lb. of sulfur obtained by the process.

I claim:

1. A process for recovering elemental sulfur from native sulfur-bearing ores which comprises the steps of:
    1. preparing a classified grind of the ore in a particle size range of minus 3 to plus 100 mesh.
    2. preparing an aqueous slurry of the ground ore of about 50 percent solids by weight.
    3. preheating the slurried ore to a temperature slightly less than the boiling point of water at ambient atmospheric pressure,
    4. forming the preheated slurry as a bed having upper and lower surfaces,
    5. steaming the upper surface of the bed at a steam pressure in the range of about 35 to 55 pounds per square inch absolute,
    6. withdrawing steam from beneath the lower surface of the bed to maintain a differential in steam pressure between upper and lower bed surfaces of about 8 pounds per square inch absolute or more and a steam pressure in the range of about 23–29 pounds per square inch absolute beneath the lower bed surface,
    7. collecting molten sulfur and condensate beneath the slurry bed while retaining substantially sulfur-free ore on the bed, and
    8. separately removing molten sulfur and condensate from beneath the slurry bed.

2. The process of claim 1 wherein the steam pressure applied against the upper bed surface is 45 pounds per square inch absolute and steam withdrawal beneath the bed is at a rate which creates a steam pressure differential of 8 pounds per square inch absolute between bed surfaces.

3. The process of claim 1 wherein the particle size of the grind is between about minus 10 and plus 40 mesh.

4. The process of claim 1 wherein the slurry is preheated to a temperature about 2° C. below the boiling point of water at ambient pressure.

5. The process of claim 1 wherein the recovered sulfur is limed and filtered.

6. The process of claim 1 wherein condensate from step (8) is fed to the preheater.

7. The process of claim 6 wherein condensate from step (8) is also fed to preheat boiler feed for the steaming operations.

8. The process of claim 1 wherein the withdrawn steam of step (6) is passed through a pressure-increasing means for recycle to step (5).

9. The process of claim 8 wherein the pressure-increasing means is a steam-driven, open, back-shrouded, impeller-type, centrifugal blower.

10. The process of claim 1 wherein the ore has a sulfur content of at least 20 percent by weight.

* * * * *